United States Patent
Pendyala et al.

(10) Patent No.: US 12,222,210 B1
(45) Date of Patent: Feb. 11, 2025

(54) ROUTE GUIDANCE SYSTEM

(71) Applicants: Srichand Pendyala, Cupertino, CA (US); Marlene Wan, Cupertino, CA (US); Craig M. Hiller, Santa Clara, CA (US); Lukas M. Marti, San Jose, CA (US); Josh Redding, San Jose, CA (US)

(72) Inventors: Srichand Pendyala, Cupertino, CA (US); Marlene Wan, Cupertino, CA (US); Craig M. Hiller, Santa Clara, CA (US); Lukas M. Marti, San Jose, CA (US); Josh Redding, San Jose, CA (US)

(73) Assignee: APPLE INC., Cupertino, CA (US)

( * ) Notice: Subject to any disclaimer, the term of this patent is extended or adjusted under 35 U.S.C. 154(b) by 271 days.

(21) Appl. No.: 18/161,512

(22) Filed: Jan. 30, 2023

Related U.S. Application Data

(63) Continuation of application No. 16/535,488, filed on Aug. 8, 2019, now Pat. No. 11,604,073.
(Continued)

(51) Int. Cl.
*G01C 21/34* (2006.01)

(52) U.S. Cl.
CPC ..... *G01C 21/3453* (2013.01); *G01C 21/3446* (2013.01)

(58) Field of Classification Search
CPC ............ G01C 21/3453; G01C 21/3446
See application file for complete search history.

(56) References Cited

U.S. PATENT DOCUMENTS

| 5,938,720 A | 8/1999 | Tamai |
| 6,026,346 A | 2/2000 | Ohashi et al. |

(Continued)

FOREIGN PATENT DOCUMENTS

| CN | 102110362 A | * | 6/2011 | ............... G08G 1/00 |
| GB | 82556876 A | | 6/2018 | |
| JP | 2008096445 A | | 4/2008 | |

OTHER PUBLICATIONS

"A Review of Motion Planning Techniques for Automated Vehicles" by D. Gonzalez et al., IEEE Transactions on Intelligent Transportation Systems, vol. 17 No. 4, Apr. 2016, pp. 1135-1145 (Year: 2016).*

(Continued)

*Primary Examiner* — Michael V Kerrigan
*Assistant Examiner* — Tanya C Sienko
(74) *Attorney, Agent, or Firm* — Young Basile Hanlon & MacFarlane, P.C.

(57) ABSTRACT

A method includes determining a routing graph based on a map, wherein the routing graph represents locations from the map; determining a routing horizon based on the routing graph, wherein the routing horizon defines a portion of the routing graph that is usable for routing; determining a cost-action structure that includes, for each location of the routing horizon, a cost-to-go value for travel from a respective location from the routing horizon to a destination, wherein the cost-to-go values implicitly describe an optimal route for travel from each of the respective locations from the routing horizon to the destination; receiving, from an autonomous agent, a request that specifies one of the locations from the routing horizon; and providing, to the autonomous agent, information from the cost-action structure based on the specified location from the routing horizon.

21 Claims, 7 Drawing Sheets

Related U.S. Application Data

(60) Provisional application No. 62/735,380, filed on Sep. 24, 2018.

(56) References Cited

U.S. PATENT DOCUMENTS

| | | | |
|---|---|---|---|
| 6,636,800 | B1 | 10/2003 | Lauther et al. |
| 6,826,472 | B1 | 11/2004 | Kamei et al. |
| 8,504,284 | B2 | 8/2013 | Brulle-Drews et al. |
| 9,784,589 | B1 | 10/2017 | Gyenes et al. |
| 11,017,665 | B1 | 5/2021 | Roy |
| 2008/0220862 | A1 | 9/2008 | Axelrod et al. |
| 2013/0231862 | A1 | 9/2013 | Delling et al. |
| 2015/0153180 | A1 | 6/2015 | Ettinger et al. |
| 2016/0202076 | A1 | 7/2016 | Feng |
| 2016/0203422 | A1 | 7/2016 | Demarchi et al. |
| 2016/0334236 | A1 | 11/2016 | Mason et al. |
| 2017/0314945 | A1 | 11/2017 | König et al. |
| 2017/0336219 | A1 | 11/2017 | Di Lorenzo et al. |
| 2017/0370738 | A1 | 12/2017 | Park et al. |
| 2018/0238697 | A1 | 8/2018 | Maru et al. |
| 2020/0011690 | A1 | 1/2020 | Becker et al. |
| 2020/0242922 | A1 | 7/2020 | Dulberg et al. |
| 2020/0290619 | A1 | 9/2020 | Mehdi et al. |

OTHER PUBLICATIONS

"Automatic Vehicle Navigation using Dijkstra's Algorithm" by M. Parulekar et al., ICATE 2013 Paper !D 42 (Year: 2013).*

Machine translation of CN 102110362 downloaded from IP.com Nov. 30, 2024 (Year: 2024).*

Miller, J., Mendard, T., "Determining Time to Traverse Road Sections Based on Mapping Discrete GPS Vehicle Data to Continuous Flows", Conference Paper, Jul. 2010.

American Map Corporation, Illinois State Map (date unlisted, but published before the I-57 to I-294 link was constructed) (Year: 2016).

Wikipedia, Entry for Reachability (graph) (Year: 2021).

Wikipedia, "Dijkstra's algorithm", Wikipedia Entry, accessed Dec. 13, 2021. Used for definition (Year: 2021).

* cited by examiner

ROUTE GUIDANCE SYSTEM

CROSS-REFERENCE TO RELATED APPLICATIONS

This application is a continuation of U.S. patent application Ser. No. 16/535,488, filed on Aug. 8, 2019, which claims the benefit of U.S. Provisional Application No. 62/735,380 filed on Sep. 24, 2018, the contents of which are hereby incorporated by reference in their entireties for all purposes.

TECHNICAL FIELD

The application relates generally to the field of routing using digital maps.

BACKGROUND

Digital maps store mapping information in a computer-interpretable format, and can include information that represents, as examples, geographical features, topographical features, political boundaries, attractions, transportation networks, and traffic conditions. Routing and navigation systems are known that determine a route from an origin to a destination using segments of transportations networks that are represented in a digital map. A person or agent can use the route to travel from the origin to the destination. After the route is determined, the route is recomputed if the person or agent deviates from the route, and the person or agent is re-routed.

SUMMARY

One aspect of the disclosure is a method that includes determining a routing graph based on a map, wherein the routing graph represents locations from the map, determining a routing horizon based on the routing graph, wherein the routing horizon defines a portion of the routing graph that is usable for routing, and determining a cost-action structure that includes, for each location of the routing horizon, a cost-to-go value for travel from a respective location from the routing horizon to a destination, wherein the cost-to-go values describe an optimal route for travel from each of the respective locations from the routing horizon to the destination. The method also includes receiving, from an autonomous agent, a request that specifies one of the locations from the routing horizon and providing, to the autonomous agent, information from the cost-action structure based on the specified location from the routing horizon.

In some implementations of the method, the routing horizon is determined based on a current location of the autonomous agent.

In some implementations of the method, the cost-to-go value is multi-dimensional.

In some implementations of the method, the routing horizon includes cost information. The cost-to-go value may be determined based on the cost information from the routing horizon. The cost-to-go value is determined based on constraints provided by the autonomous agent.

In some implementations of the method, the information that describes the current location of the autonomous agent is received subsequent to determination of the cost-action structure. The cost-action structure may be determined such that the cost-to-go value for each location of the routing horizon and the optimal route for each location of the routing horizon from the cost-action structure are not dependent on the current location of the autonomous agent.

In some implementations of the method, the information from the cost-action structure is provided to the autonomous agent in response to a request from the autonomous agent. The request from the autonomous agent may be based on a proposed action and the information from the cost-action structure that is provided to the autonomous agent includes the cost-to-go value and the optimal route for the respective location from the routing horizon that corresponds to the proposed action.

Another aspect of the disclosure is a non-transitory computer-readable storage device including program instructions executable by one or more processors that, when executed, cause the one or more processors to perform operations. The operations include determining a routing graph based on a map, wherein the routing graph represents locations from the map, determining a routing horizon based on the routing graph, wherein the routing horizon defines a portion of the routing graph that is usable for routing, and determining a cost-action structure that includes, for each location of the routing horizon, a cost-to-go value for travel from a respective location from the routing horizon to a destination, wherein the cost-to-go values implicitly describe an optimal route for travel from each of the respective locations from the routing horizon to the destination. The operations further include receiving, from an autonomous agent, information that specifies one of the locations from the routing horizon, and providing, to the autonomous agent, information from the cost-action structure based on the specified location from the routing horizon.

In some implementations of the non-transitory computer-readable storage device, the routing horizon is determined based on a current location of the autonomous agent.

In some implementations of the non-transitory computer-readable storage device, the cost-to-go value is multi-dimensional.

In some implementations of the non-transitory computer-readable storage device, the routing horizon includes cost information, the cost-to-go value is determined based on the cost information from the routing horizon, and the cost-to-go value is determined based on constraints provided by the autonomous agent.

In some implementations of the non-transitory computer-readable storage device, the request from the autonomous agent is received subsequent to determination of the cost-action structure, and the cost-to-go value for each location of the routing horizon and the optimal route for each location of the routing horizon from the cost-action structure are not dependent on a current location of the autonomous agent.

In some implementations of the non-transitory computer-readable storage device, the request from the autonomous agent includes a proposed action and the information from the cost-action structure that is provided to the autonomous agent includes the cost-to-go value and the optimal route for the respective location from the routing horizon that corresponds to the proposed action.

Another aspect of the disclosure is a system that includes a memory and a processor configured to execute instructions stored in the memory. When executed, the instructions cause the processor to determine a routing graph based on a map, wherein the routing graph represents locations from the map, determine a routing horizon based on the routing graph, wherein the routing horizon defines a portion of the routing graph that is usable for routing, and determine a cost-action structure that includes, for each location of the routing horizon, a cost-to-go value for travel from a respective location from the routing horizon to a destination, wherein the cost-to-go values describe an optimal route for travel from each of the respective locations from the routing horizon to the destination. The instructions further cause the processor to receive, from an autonomous agent, a request that specifies one of the locations from the routing horizon, and provide, to the autonomous agent, information from the cost-action structure based on the specified location from the routing horizon.

In some implementations of the system, the routing horizon is determined based on a current location of the autonomous agent.

In some implementations of the system, the cost-to-go value is multi-dimensional.

In some implementations of the system, the routing horizon includes cost information, the cost-to-go value is determined based on the cost information from the routing horizon, and the cost-to-go value is determined based on constraints provided by the autonomous agent.

In some implementations of the system, the request from the autonomous agent is received subsequent to determination of the cost-action structure, and the cost-to-go value for each location of the routing horizon and the optimal route for each location of the routing horizon from the cost-action structure are not dependent on a current location of the autonomous agent.

In some implementations of the system, the request from the autonomous agent is based on a proposed action and the information from the cost-action structure that is provided to the autonomous agent includes the cost-to-go value and the optimal route for the respective location from the routing horizon that corresponds to the proposed action.

DETAILED DESCRIPTION

The disclosure herein is directed to a route guidance system for an autonomous agent. A data structure, referred to herein as a cost-action structure, is constructed to represent travel costs for traversing all nodes and links within an area (e.g., several kilometers or more) around the autonomous agent, which is represented herein by a routing horizon. The cost-action structure, once determined, can be utilized to determine the cost to travel from an origin to a destination along any valid route within the routing horizon. This allows multiple routes to be evaluated without recomputation of the route, allowing for real-time guidance of an autonomous agent. For example, the autonomous agent can assess, without recomputation by the route guidance system, the effect of a particular route decision, such as a lane change or a turn at an intersection that does not follow a predetermined route.

Figure 1:
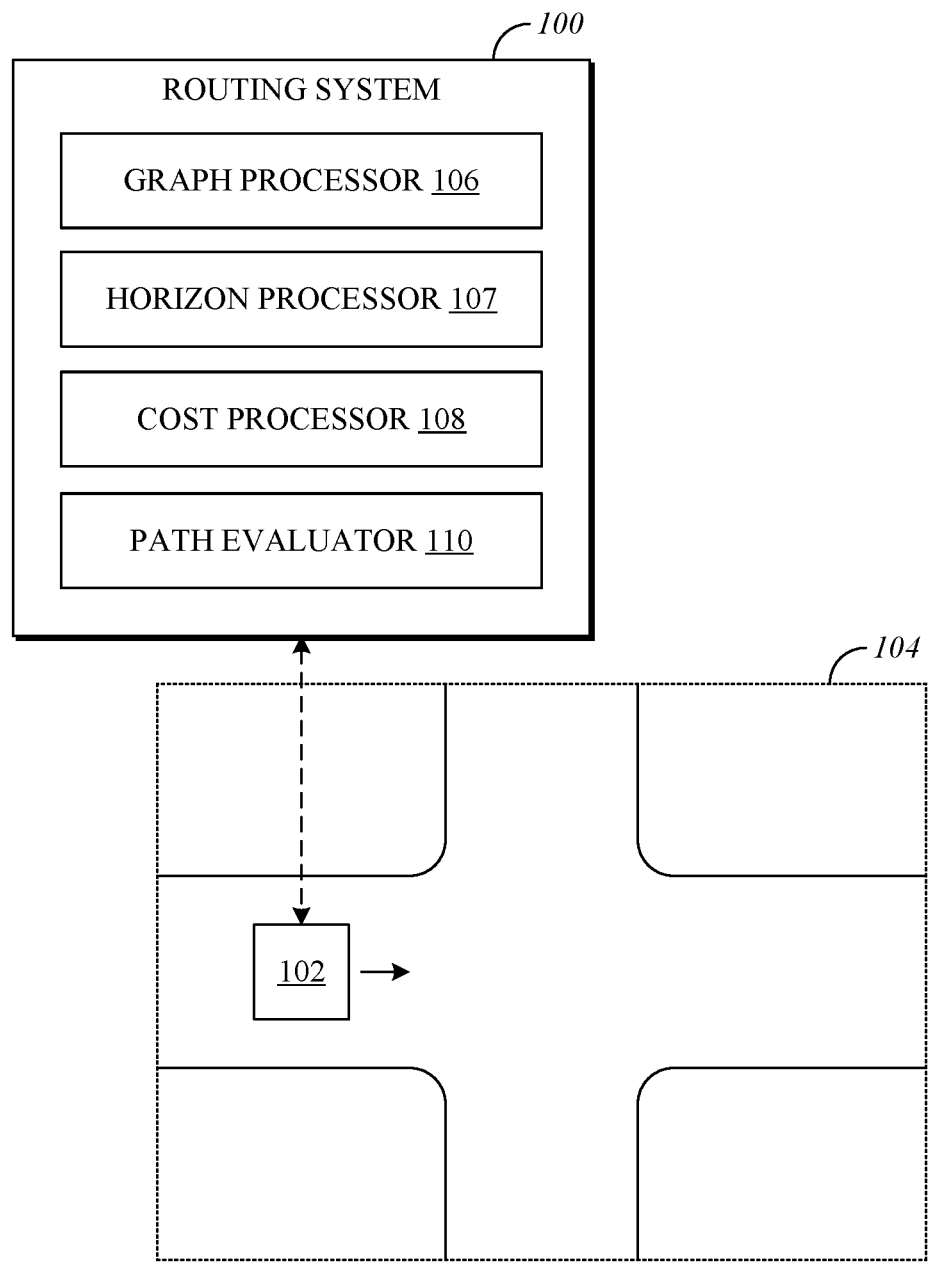
FIG. 1 is an illustration that shows a routing system that guides an autonomous agent that is traveling in an environment.

FIG. 1 is an illustration that shows a routing system 100 that guides an agent 102 (also referred to as an "autonomous agent") while it travels within an environment 104. The routing system 100 provides information to the agent 102 to assist the agent 102 during travel from a current location to a destination. The routing system 100 is a computer-implemented system that may be located remote from the agent 102 (e.g., a remote server computer in wireless communication with the agent 102) or may be a part of the agent 102 (e.g., as an on-board system that is in wired or wireless communication with other systems).

As will be explained further herein, the routing system 100 may include a graph processor 106, a horizon processor 107, a route processor 108, and a path evaluator 110. The graph processor 106, the route processor 108, and the path evaluator 110 are examples of functional systems that can be used to implement the routing system 100. It should be understood that other architectures could be utilized to implement the routing system 100, including different ways of defining and separating various functions implemented by the routing system 100.

The agent 102 is an autonomous system or a semi-autonomous system that is mobile and is able to travel through the environment 104 while sensing information associated with the environment 104 and making decisions regarding movement within the environment 104. Examples of decisions made by the agent 102 may include gross-control decisions, such as selection of a route from an origin to a destination, and fine control decisions, such as whether to accelerate, decelerate, turn, etc.

In one implementation, the agent 102 may be a road-going vehicle, such as a passenger vehicle or a cargo vehicle that includes autonomous driving systems that automate some or all of the control tasks associated with vehicle operation. Control decisions made by the agent 102 may be used as control inputs for vehicle actuator systems, such as propulsion actuator systems, steering actuator systems, braking actuator systems, and suspension actuator systems. The agent 102 may be incorporated in other types of systems, such as off-road ground vehicles that are utilized in indoor spaces (e.g., a warehouse) or in outdoor spaces (e.g., a farm).

The environment 104 includes the physical space that the agent 102 is operating in, including fixed obstructions and moving obstacles. As an example, the environment 104 may be a transportation network that includes roads, dedicated bicycle lanes, sidewalks, and crosswalks.

Figure 2:
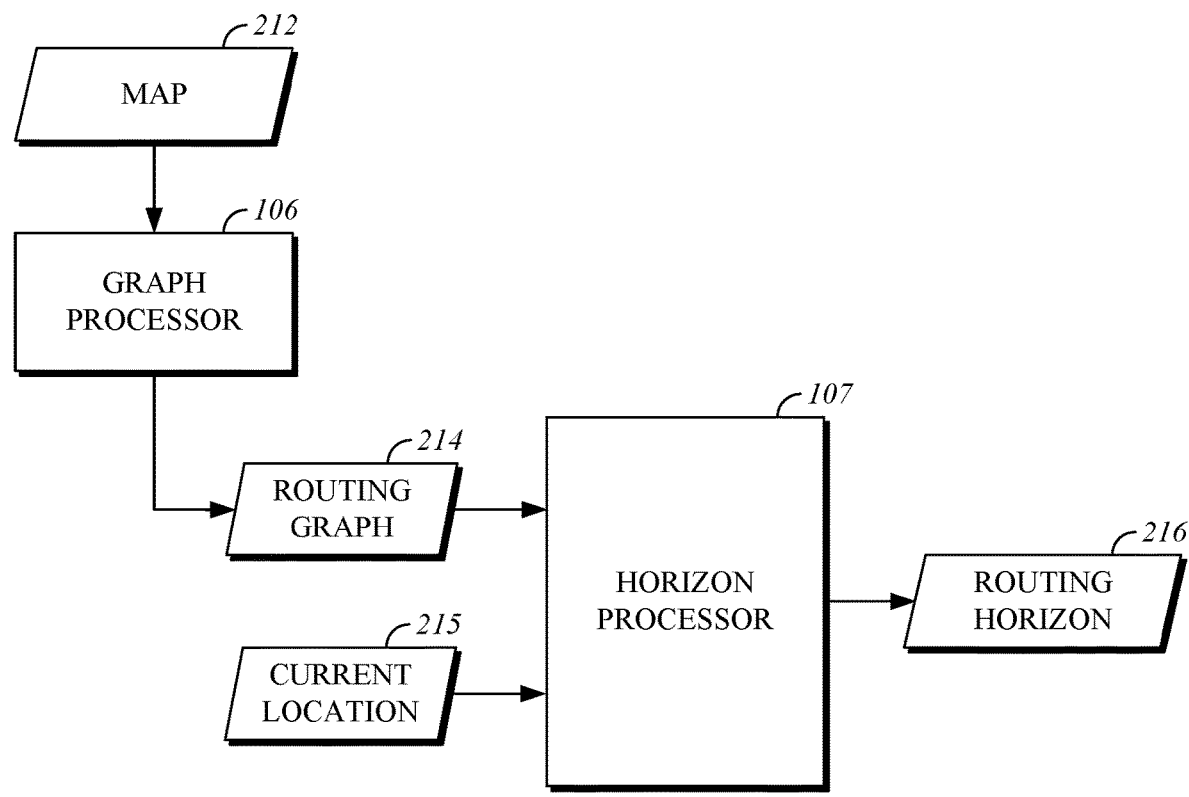
FIG. 2 is a block diagram that shows a graph processor and a horizon processor of the routing system.

FIG. 2 is a block diagram that shows the graph processor 106 and the horizon processor 107 of the routing system 100. In the illustrated example, the graph processor 106 accepts a map 212 as an input and produces a routing graph 214 as an output. The horizon processor 107 receives the routing graph 214 and a current location 215 as inputs. The horizon processor 107 produces a routing horizon 216 as an output.

The map 212 is a digital map that represents real-world physical locations and includes data elements that represent features found in the real-world physical locations, such as a physical transportation network. In a simple example, a digital map can be defined using segments (e.g., a line between a starting point and an ending point) and information that describes connections between segments (i.e., whether travel between adjacent segments is permitted).

In some implementations, the map 212 may be a standard definition digital map that includes road-level geometry that is encoded at mapping grade accuracy. In other implementations, the map 212 may be a high-definition digital map that includes lane-level geometry encoded at survey grade accuracy, as well as information that attempts to describe applicable rules of the road. Other types of information may be included in the map 212.

Various types of data structures can be utilized to encode mapping information in the map 212. As one example, the map 212 may be a collection of data elements that define a transportation network, including segments. Segments represent a portion of a transportation network by which an agent can travel from a first location that is associated with the segment to a second location that is associated with the segment. The segments may correspond to various features of the transportation network. For example, segments may be of multiple types, such as roadway segments, lane segments, pedestrian segments, and bicycle segments. Additional elements of the map 212 can also be encoded, such as lane boundaries and locations where stopping or yielding may be required. In some implementations, elements of the map 212 are stored in a hierarchical structure. For example, a roadway segment can include multiple lane segments as well as bicycle segments, pedestrian segments, and information describing the presence of traffic control devices.

Connections between segments may include, for example, connections between successive segments that are connected end-to-end in order, connections between several segments in a common area (i.e., an intersection), and connections between adjacent segments, where the adjacent segments represent lanes and the connections are indicative of an ability to transition between segments by making a lane change.

The routing graph 214 is a data structure that may be configured according to graph theory conventions in order to model the ability of the agent 102 to travel between destinations represented by the map 212. The routing graph 214 includes information that corresponds to portions of the map 212. This information may be encoded as nodes and edges, for example, that represent locations and connectivity between locations. An edge from the routing graph 214 that is defined using information from the map 212 may represent, for example, a travel lane from a road, and information may be included in the routing graph 214 in association with the edge that describes aspects of the travel lane, such as geometric features, connectivity to other travel lanes, connectivity to intersections, cost information, and regulatory information (e.g., a speed limit). A node from the routing graph 214 that is defined using information from the map 212 may represent, for example, an intersection where roads meet, and may include additional information that describes aspects of the intersection such as a type of right-of-way control (e.g., stop control or traffic signal), connectivity to travel lanes, connectivity to intersections, and regulatory information (e.g., a left turn prohibition).

The graph processor 106 encodes the routing graph 214 using knowledge from the map 212. For example, the graph processor 106 can convert elements from the map 212 into graph elements, such as by defining an edge in the routing graph 214 for each travel lane from a road segment, and defining a node in the routing graph 214 at each location from the map 212 (e.g., at roadway intersections) where a vehicle (or bicycle, pedestrian, etc.) could travel from one road segment, travel lane, or other portion of the transportation network to another portion of the transportation network.

The routing graph 214 is configured such that portions of the map 212 are represented in the routing graph 214 in a manner that allows quick association of portions of the map 212 with portions of the routing graph 214. Thus, information can be obtained from the routing graph 214 based on locations from the map 212 and vice-versa. Because portions of the routing graph 214 correspond to portions of the map, the routing graph 214 may be constructed such that all portions of the routing graph 214 correspond to real-world locations in the physical transportation network that is represented by the map 212.

The routing graph 214 is also configured to allow cost information to be associated with portions of it such as nodes and edges. This allows for computation of the cost associated with traversing portions of the map 212, for example, from a starting location to a destination location.

Each element of the routing graph 214 (e.g., node and edges) can represent a contiguous area in real space as opposed to a discrete location. Elements of the routing graph 214 may be characterized by a common set of travel options from the contiguous area to other areas. For example, an edge of the routing graph 214 may represent a segment of a street that ends in an intersection, and for which the only valid travel option is to proceed to the node. The node representing the intersection may represent the spatial extents of the intersection (e.g., locations at which a vehicle may be considered present in the intersection for the purpose of determining right-of-way), and when the agent 102 is present within the spatial extents of the intersection, a single set of possible travel options may be defined for the agent 102, such as a left turn, a right turn, or a straight-through movement.

The extents of the routing graph 214 may include all of the map 212 or a portion of the map 212.

The current location 215 represents the position of the agent 102 relative to the environment 104 at the time that routing information is computed or at the time when a decision is being made using the routing information. As an example, information that describes the position of the agent 102 relative to the environment 104 can be obtained from a satellite positioning system or from any other suitable system. This information is transmitted to the routing system 100 as the current location 215.

In one implementation, the routing horizon 216 is defined as a set of portions of the routing graph 214, such as lane segments in this example, within a vicinity of the agent 102. This set of lane segments is a subset of the lane segments from the entirety of the map 212. Lane segments (or other portions of the routing graph 214) may be chosen to be a part of the routing horizon 216 based on one or more metrics. Examples metrics that can be used to define the routing horizon 216 include: all lane segments that are within a radius distance of the current location 215 of the agent 102; all lane segments that are reachable within a specified driving distance of the current location 215 of the agent 102; all lane segments that are reachable within a specified travel time from the current location 215 of the agent 102; and all lane segments that are reachable by the agent 102 prior to reaching a next intersection.

Depending on the metric chosen for defining the routing horizon 216, the routing horizon 216 may be computed either by performing a spatial search on the routing graph 214, by performing a topological search on routing graph 214, by some combination of spatial and topological search, or by other suitable methods. For instance, identifying all lane segments that are within a radius distance of the current location 215 of the agent 102 implies a spatial search, while other metrics mentioned above imply a topological search.

When computed by a spatial search, the routing horizon 216 may be parametrized by way of spatial constraints. Any spatial search algorithm may be used to find all of the lane segments that satisfy the spatial constraint. A spatial index may be used to speed up such searches. Examples of commonly used spatial indices include Quad-trees, R-trees and bounding volume hierarchies.

When computed by a topological search on the routing graph 214, the routing horizon 216 may be computed by minimizing a combination of attributes of nodes and links in the routing graph 214. For example, the routing horizon 216 may be computed based on driving distance by a graph search that minimizes the cumulative length attributes of lane segments represented by nodes in the routing graph 214. A topological search may be used to determine the routing horizon 216 by first preparing the routing graph 214 such that it includes a set of nodes, a set of links, and a forward edge index that maps each node to a set of nodes that are reachable from that node. The current location 215 of the agent 102 is mapped to one or more overlapping lane segments in the map, which correspond to a set of nodes in the routing graph 214. For each of these nodes, a graph search algorithm is run to enumerate all nodes and edges that satisfy the constraint. The graph search accumulates all nodes that satisfy the constraints and terminates once all nodes satisfying the constraint have been inspected and the only reachable nodes violate the constraint.

In some implementations, areas may be excluded from the routing horizon 216. For example, a constraint may indicate that a certain region of the map 212, such as a specified street, or certain types of streets (e.g., neighborhood streets) should not be used for routing. This constraint may be applied by excluding the region of the map from the routing horizon 216. This constraint may also be applied within the route processor 108. For example, the route processor could apply constraints to routing by modifying costs such that very poor routing scores are produced for excluded areas which may, for example, leading the route processor to determine that a destination is not reachable along paths that utilize the area that is intended to be excluded.

Figure 3:
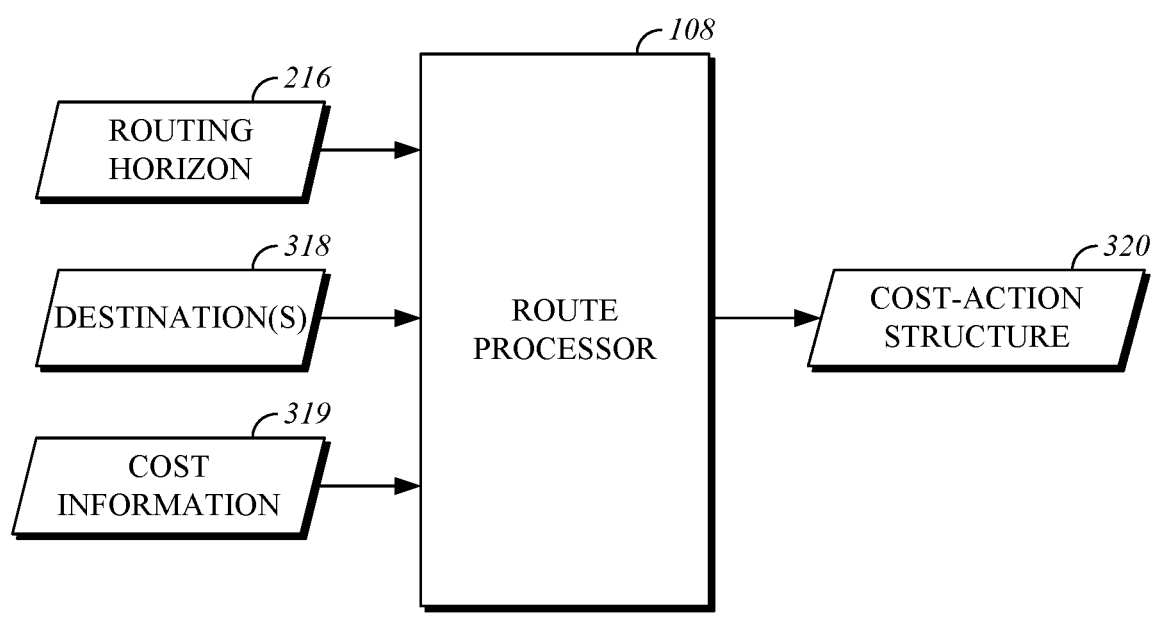
FIG. 3 is a block diagram that shows a route processor of the routing system.

FIG. 3 is a block diagram that shows the route processor 108 of the routing system 100. The route processor 108 receives the routing horizon 216, destinations 318, and cost information 319 as inputs. The route processor 108 produces a cost-action structure 320 as an output.

The destinations 318 represent a final destination that is desired by the agent 102 along with any intermediate destinations. The destinations 318 can be treated as routing constraints by the routing system 100 by constraining proposed routes such to those that pass through the area of the destinations 318.

As one example, the destinations 318 may be provided to the agent 102 in the form of inputs made by a human user of the agent 102 (e.g., a passenger). As another example, the destinations 318 may be provided to the agent 102 by an automated system, such as a dispatch system that directs the agent 102 to proceed to certain locations to pick up or drop off passengers and/or goods. In some routing scenarios, the destinations 318 are treated waypoints that must be reached by the agent 102.

Determining that a waypoint has been reached can be performed based on the location of the agent 102 relative to the waypoint and does not necessarily require that the agent 102 be present at a precise location. As one example, a waypoint can be reached when the agent 102 is located within a threshold distance from the waypoint. As another example, a waypoint can be reached when the agent 102 is present at a location that is adjacent to the waypoint (e.g., at an adjacent graph element from the routing graph 214).

The route processor 108 determines cost information for all locations in the routing horizon 216 using the cost information 319. The cost information 319 for each portion of the routing horizon 216 may represent a cost associated with traversing that portion of the routing horizon 216. Cost is a metric that is related to the burden associated with travel from a location to a certain destination and is based on currently-active constraints. As one example, the cost could be expressed in terms of a distance value if the user has requested the shortest possible route. As another example, the cost could be expressed in terms of a time value if the user has requested a route having the lowest possible travel time. As another example, the cost could be a unitless value that is based on weighted factors such as distance and travel time. As another example, cost could be expressed as a multi-factor variable that expresses individual values for each of multiple cost components. By expressing cost as a multi-factor variable later analysis can weight cost differently (i.e., apply different constraints).

The cost information 319 may be multi-dimensional. As examples, the cost for traversing a portion of the routing graph 214 can include a time cost value, a distance cost value, and an energy (e.g., fuel or battery power) cost value. Other cost values may be included in the cost information 319.

Some types of costs that are included in the cost information 319 are static, such as distance, and can be obtained from data sources such as a map or a database. Other types of costs that are included in the cost information 319 information are dynamic, such as travel time that varies in correspondence to traffic conditions and can be obtained from or calculated based on any suitable data source, such as real-time traffic monitoring information. Once determined, the cost information is associated with the routing horizon 216.

The cost-action structure 320 is utilized to store information that allows the agent 102 to understand and evaluate the cost associated with taking actions such as a lane change or selection of a specific route (e.g., selecting a route other than an optimal route). The cost-action structure 320 may include, for all locations from the routing horizon 216, a cost-to-go to one or more of the destinations 318 and an optimal route to one or more of the destinations 318. The cost-to-go represents the cost to travel to the destination by the optimal route from the respective location from the routing horizon 216. The cost-to-go may be included in the cost-action structure 320 in a multi-dimensional format (e.g., a high dimensional vector), which specifies the cost-to-go for each of multiple cost factors, to allow subsequent weighting the of cost factors to determine a weighted cost, using constraints provided by the agent 102. As examples, the cost-to-go values may be expressed in terms of one or more of travel time, travel distance, fuel consumption, and other metrics.

The optimal route from each location to the destination may be determined using any suitable pathfinding technique or algorithm, such as Dijkstra's algorithm, and may utilize an assumption as to cost weighting, or may utilize weightings provided by the agent 102. As one example, the optimal route utilized in the cost-action structure 320 may be a one-dimensional cost that is based on a single cost factor, such as distance or travel time. The cost-to-go values implicitly describe the optimal route from each location of the routing graph 214 to the destinations 318, given that the optimal route can be followed from a location to one of the destinations by traveling from each node along the connected link having the lowest cost-to-go value among all of the links that are connected to that node. As needed, the cost-action structure 320 can be interpreted to identify an optimal route from a specific location to a specific one of the destinations 318, for example, in response to a query. In some implementations, the cost-action structure 320 may include the optimal route from each location of the routing graph 214 to each of the destinations 318 in an explicit form, such as by defining the optimal route as a list of all nodes to traverse and links to follow, or in an implicit form.

The cost-to-go value for a location of the routing graph 214 (e.g., which represents a specific lane segment on a road) captures the cost to go to one of the destinations 318 from that location, through all intermediate locations. Using the cost-to-go values from the cost-action structure 320, the destinations 318 can be reached in an optimal manner by successively travelling to the next adjacent location that has the lowest cost-to-go value out of all of the adjacent locations. The cost-to-go value may be a single valued scalar or a vector of values that are reducible to a single value by weighting the components of the vector.

A cost function maps a route graph node describing a location (e.g., a lane segment) to a 'traversal cost' and an edge between route graph nodes describing lane segment to a 'transition cost'. These costs are described in arbitrary 'cost units' specific to a cost function. The cost-to-go value for a lane segment describes the lowest sum of transition and traversal costs required to traverse from a location (e.g., a lane segment) to the destination.

To allow computation of the cost-to-go values for each location of the routing graph 214 in the routing horizon 216, the routing graph 214 includes a forward edge index and a reverse edge index. The forward edge index of the routing graph 214 describes all nodes that are reachable from a given node and allows querying all nodes that are reachable from the given node. The reverse edge index of the routing graph 214 describes all nodes that a given node is reachable from and allows querying what nodes the given node is reachable from.

As an example, the cost-to-go values may be computed in a three-step process. First, each location (e.g., lane segment) in the routing graph 214 is assigned a traversal cost that represents the difficulty of traveling the length of the location (e.g., lane segment). For example, the traversal cost of a lane segment may be derived from its length. Each link between neighboring locations (e.g., lane segments) is also assigned a 'transition cost', representing the difficulty of transitioning (e.g., by a lane change) from one to another. For lane segments that are connected successively in a driving direction, no transition cost is assumed, while lane segments connected by a lane change direction may have a cost proportional to the difficulty of the lane change maneuver. Second, a cost-to-go value for each lane segment is initialized to an infinite value and a recommended action value for each lane segment is set to "none." Third, a graph search algorithm is run outwards from the current location of the agent 102 until the entirety of the routing graph 214 is visited. The objective of the search algorithm is to successively update the least-cost and action to every node in the route graph 214. Numerous well-known graph search algorithms can be used, such as Dijkstra's algorithm, the A* algorithm, and the Bellman-Ford algorithm. In some implementations, the search algorithm may traverse edges using the reverse edge index of the routing graph 214. In other implementations, the search algorithm may traverse edges using the forward edge index.

After the graph search algorithm terminates, the cost-to-go values may be inspected to determine if a path to the destination exists from the current location of the agent 102. An infinite cost-to-go value for the destination signifies that the destination is unreachable, while a finite cost-to-go value indicates that the destination is reachable.

The route processor 108 determines a cost-to-go to one or more of the destinations 318 (e.g., to a next destination) and the optimal route to the one or more destinations 318 for all locations from the routing horizon 216. For example, for each location from the routing horizon, the cost-to-go can be determined by accumulating the cost values from the cost information for all links traversed by the optimal route from the location to the destination. This information is stored in the cost-action structure 320 and is provided to the path evaluator 110 as an input. The optimal route may be determined and stored implicitly or explicitly.

Determination of the cost-to-go and the optimal route for each of the locations within the routing horizon 216 is performed independent of the current location of the agent 102. Thus, instead of depending upon the positional relationship of the agent 102 relative to the destinations 318, the information in the cost-action structure 320 is dependent upon the locations from the routing horizon 216 and the destinations 318. Because of this, the information contained in the cost-action structure 320 does not change as the agent 102 travels toward the destinations 318. As will be explained further herein, this allows the cost-action structure 320 to be used to provide routing guidance without recomputation in the event that the agent 102 deviates from an expected route or proposes a deviation from an expected route.

Figure 4:
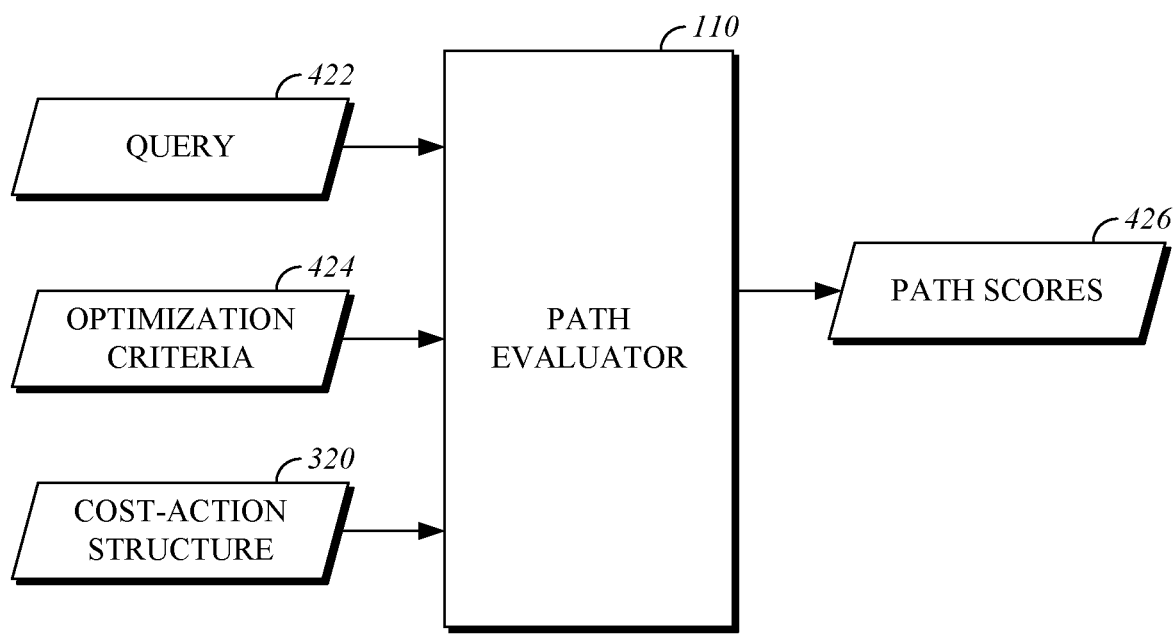
FIG. 4 is a block diagram that shows a path evaluator of the routing system.

FIG. 4 is a block diagram that shows the path evaluator 110 of the routing system 100. The path evaluator 110 receives a query 422, optimization criteria 424, and the cost-action structure 320 as inputs. The path evaluator 110 produces path scores 426 as outputs. The query 422 is a request that is made by the agent 102 and asks the path evaluator 110 to provide specific information that is determined by the path evaluator. The optimization criteria 424 are constraints that are provided to the path evaluator by the agent 102 and are considered by the path evaluator 110 when determining the path scores, such as by applying a certain weighting to multi-dimensional cost information. The path scores 426 are information that is provided to the agent 102 by the path evaluator 110 to answer the query 422, and may include, as examples, suggested routes, scores representing costs associated with using routes, and costs associated with taking specific actions.

Generally, the path evaluator 110 provides information from the cost-action structure 320 to the agent 102 based at least in part on the current location of the agent 102. As one example, the query 422 may ask the path evaluator 110 for an optimal route to a destination and a cost associated with taking that route. As another example, the query 422 may ask the path evaluator for the cost to go to the destination for each of multiple proposed future actions, such as for all possible actions (e.g., turn left, turn right, go straight) that can be taken by the agent 102 at a certain location. This information can be returned to the agent 102 by the path evaluator 110 as the path scores 426 and may include additional information. The information that is received by the agent 102 from the path evaluator 110 can be used in multiple ways by the agent 102. As an example, a motion planning system of the agent 102 can decide whether to take an action in the future based on the information that is received from the path evaluator 110.

Figure 5:
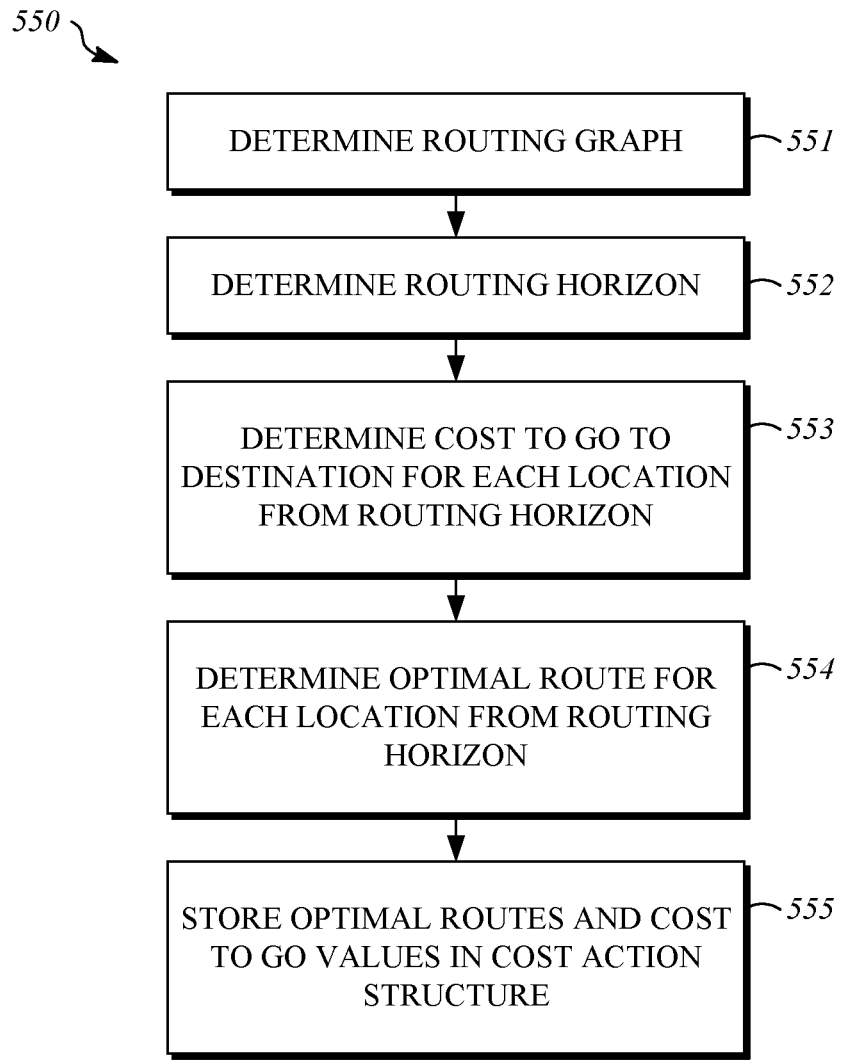
FIG. 5 is a flowchart that shows a cost-action structure determination process.

FIG. 5 is a flowchart that shows a cost-action structure determination process 550. The cost-action structure determination process 550 can be performed using a computing device that is provided with computer program instructions that facilitate route guidance operations. The computer program instructions can be stored in a storage device or a memory device and executed by a processor to facilitate performance of the process 550 as described herein. The operations of the cost-action structure determination process 550 may be performed by the routing system 100 including one or more of the graph processor 106, the horizon processor 107, the route processor 108, and the path evaluator 110. In some implementations, some or all of the operations of the cost-action structure determination process 550 may be performed by the agent 102.

The routing graph 214 is determined in operation 551. The routing graph 214 may be determined based on the map 212 and represents locations that exist in a real-world physical transportation network. As an example, the routing graph 214 may be determined by constructing nodes and edges from structures in the map 212 and populating the routing graph with information from the map 212 and/or from other sources.

In operation 552, the routing horizon 216 is determined. The routing horizon 216 represents an area in which analysis will be performed to generate information that can be used to determine routes and costs associated with following routes. Generally, later analysis will not be performed for areas outside of the routing horizon 216, unless the routing horizon 216 is modified. Thus, the routing horizon 216 sets constraints on the analysis performed by the routing system 100. For example, areas of the map 212 that will not likely be used by the agent 102 during travel to the destination (e.g., areas of the map that are greater than a threshold distance from the current location 215) can be excluded from analysis.

The routing horizon 216 may be determined in the manners previously described or in other suitable ways. For example, the routing horizon 216 may be determined based on the current location 215 for the agent 102 (e.g., the location of the agent 102 when the routing horizon 216 is determined) by defining the routing horizon as a subgraph of the routing graph 214 in an area (e.g., a radius) around the current location 215 for the agent 102.

The information included in the routing horizon 216 includes cost information. The cost information can be multi-dimensional, including cost values for each of multiple types of costs. By including multi-dimensional cost information in the routing horizon 216, routing can be performed at a later time using the routing graph based on any or all of the types of costs, such as by selecting a single type of cost for analysis, or by weighting some or all of the costs to determine a weighted cost value.

As will be explained with respect to operations 553, 554, and 555, the routing horizon 216 is used to determine the cost-action structure 320. As explained herein, the cost-action structure 320 is determined for the locations in the routing horizon 216 based on the position of each location relative to the destination of the agent 102. Thus, the cost-action structure 320 is determined such that the cost-to-go value for each location of the routing horizon 216 and the optimal route for each location of the routing horizon 216 are not dependent on the current location 215 of the agent 102 because they represent travel costs that would be incurred by the agent for travel to the destination if the agent were present at the respective location from the routing horizon.

In operation 553, a cost-to-go value is determined for each location in the routing horizon 216. The cost-to-go represents a cost to travel from the respective location to the destination. The cost-to-go can be determined for each of multiple cost factors and can be stored in a multi-dimensional format. In operation 554, an optimal route for travel to the destination is determined for each location from the routing horizon 216. The optimal route can be determined as previously described, or by any other suitable method. In operation 555, the optimal routes and cost-to-go values for each of the locations of the routing horizon 216 are stored in the cost-action structure 320.

Figure 6:
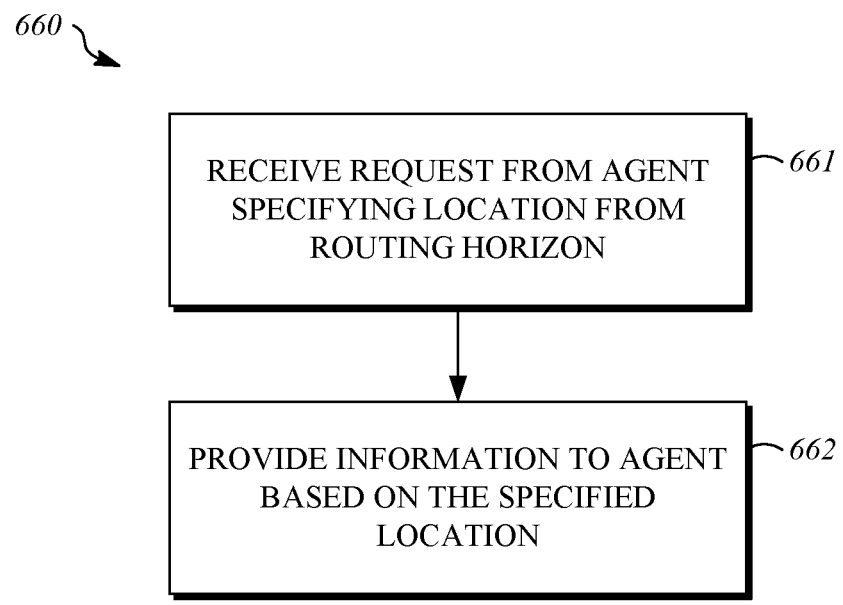
FIG. 6 is a flowchart that shows a route guidance process.

FIG. 6 is a flowchart that shows a route guidance process 660. The route guidance process 660 can be performed using a computing device that is provided with computer program instructions that facilitate route guidance operations. The computer program instructions can be stored in a storage device or a memory device and executed by a processor to facilitate performance of the process 660 as described herein. The operations of the route guidance process 660 may be performed by the routing system 100. In some implementations, some or all of the operations of the route guidance process 660 may be performed by the agent 102.

In operation 661 the routing system receives a request from the agent 102. The request specifies a location from the routing horizon 216, which may be expressed in terms of a location from the map 212, in which case the corresponding location from the routing horizon 216 is identified by the routing system 100. In some implementations, the request may specify the current location 215 of the agent 102, such that the routing system 100 may provide information to the agent 102 that describes the costs and optimal routes associated with taking each of several possible actions at the current location. In some implementations, the request may specify a proposed action (e.g., what is the impact of changing lanes or turning right) or multiple alternative proposed actions.

In some implementations, that is transmitted from the agent 102 to the routing system 100 in operation 651 may include constraints that are to be used by the routing system 100 in analyzing and responding to the request. As an example, the request may include instructions that exclude use of certain portions of the routing horizon 216 or may include instructions to weight cost factors in a certain way.

In operation 662, the routing system provides information to the agent 102 based on the location from the routing graph that was specified in the request in operation 661. As an example, the information that is provided to the agent 102 can be determined by the routing system 100 in the manner described with respect to the path evaluator 110. In an example in which the request from the agent 102 in operation 661 includes a proposed action, the routing system 100 can provide information to the agent 102 from the cost-action structure 320 that includes the cost-to-go value and the optimal route for the location from the routing horizon 216 that corresponds to the proposed action.

Figure 7:
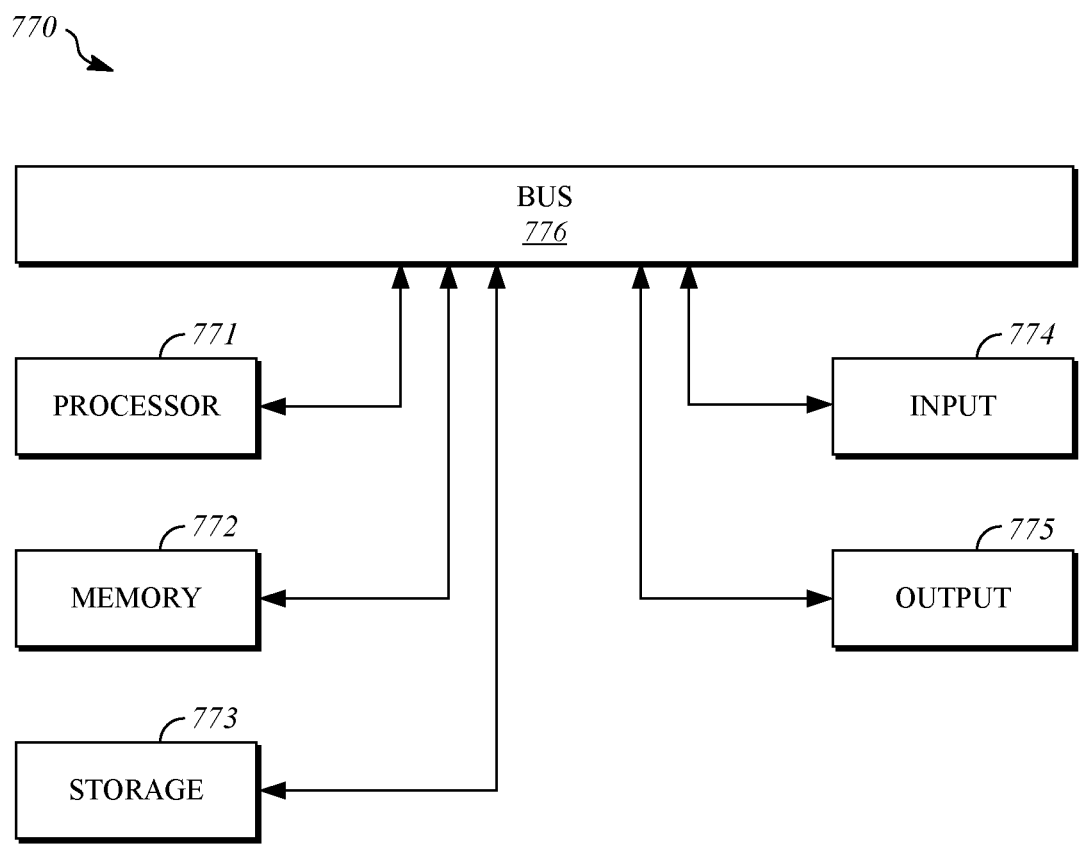
FIG. 7 is an illustration that shows an example of a configuration for a computing device.

FIG. 7 is an illustration that shows an example of a configuration for a computing device 770 that can be utilized to implement the routing system 100. The computing device 770 may also be used to implement the agent 102. The computing device 770 can include a processor 771, a memory 772, a storage device 773, one or more input devices 774, and one or more output devices 775. The computing device 770 can include a bus 776 or a similar device to interconnect the components for communication. The processor 771 is operable to execute computer program instructions and perform operations described by the computer program instructions. As an example, the processor 771 can be a conventional device such as a central processing unit. The memory 772 can be a volatile, high-speed, short-term information storage device such as a random-access memory module. The storage device 773 can be a non-volatile information storage device such as a hard drive or a solid-state drive. The input devices 774 can include any type of human-machine interface such as buttons, switches, a keyboard, a mouse, a touchscreen input device, a gestural input device, or an audio input device. The output devices 775 can include any type of device operable to provide information to a user, such as a display screen.

As described above, one aspect of the present technology is the gathering and use of data available from various sources to provide route guidance, which may be used to transport persons between origin locations and destination locations. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to grant a user access to the route guidance system (or a vehicle controlled using a route guidance system using a stored user profile). Using stored data, previously visited destinations may be presented to the user as recommendations to allow convenient selection of frequently visited destinations. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to establish a user profile. In yet another example, users can select to limit the length of time that data is maintained or entirely prohibit the storage of certain types of information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. As an example, features that are dependent or storage of certain types of data may be optional and can be omitted. As another example, such features may be implemented using non-personal information data, a bare minimum amount of personal information, or publicly available information.

What is claimed is:

1. A method, comprising:
    determining a routing graph based on a map;
    determining a routing horizon based on the routing graph, wherein the routing horizon defines a portion of the routing graph that is usable for routing, and the routing horizon includes locations that are represented by the portion of the routing graph;
    determining, for each of the locations, an optimal route from the location to a destination using the routing graph and a graph search algorithm;
    determining, for each of the locations, a cost-to-go value for travel from the location to the destination using the optimal route from the location to the destination;
    storing the optimal route and the cost-to-go value for each of the locations in a cost-action structure;

receiving, from an autonomous agent, a request for information from the cost-action structure, wherein the request from the autonomous agent is received subsequent to storing the optimal route and the cost-to-go value for each of the locations in the cost-action structure; and providing, to the autonomous agent, information from the cost-action structure in response to the request, wherein the information from the cost-action structure includes the cost-to-go value for a first one of the locations, the autonomous agent is configured to determine a control decision based on the cost-to-go value for the first one of the locations, and the autonomous agent is configured to move in accordance with the control decision.

2. The method of claim 1, wherein the request for information from the cost-action structure identifies a current location of the autonomous agent, and the information from the cost-action structure is provided based on the current location of the autonomous agent.

3. The method of claim 1, wherein the request for information from the cost-action structure identifies the first one of the locations.

4. The method of claim 3, wherein the request for information from the cost-action structure identifies a second one of the locations, the information from the cost-action structure includes the cost-to-go value for the second one of the locations, and the autonomous agent is configured to determine the control decision further based on the cost-to-go value for the second one of the locations.

5. The method of claim 1, wherein the request for information from the cost-action structure identifies a proposed action, and the first one of the locations is associated with the proposed action.

6. The method of claim 1, wherein the information from the cost-action structure that is provided to the autonomous agent in response to the request further includes the optimal route from the first one of the locations to the destination.

7. The method of claim 1, wherein the cost-to-go value for each of the locations and the optimal route for each of the locations are not dependent on a current location of the autonomous agent.

8. A non-transitory computer-readable storage device including program instructions executable by one or more processors that, when executed, cause the one or more processors to perform operations, the operations comprising:

determining a routing graph based on a map;

determining a routing horizon based on the routing graph, wherein the routing horizon defines a portion of the routing graph that is usable for routing, and the routing horizon includes locations that are represented by the portion of the routing graph;

determining, for each of the locations, an optimal route from the location to a destination using the routing graph and a graph search algorithm;

determining, for each of the locations, a cost-to-go value for travel from the location to the destination using the optimal route from the location to the destination;

storing the optimal route and the cost-to-go value for each of the locations in a cost-action structure;

receiving, from an autonomous agent, a request for information from the cost-action structure, wherein the request from the autonomous agent is received subsequent to storing the optimal route and the cost-to-go value for each of the locations in the cost-action structure; and providing, to the autonomous agent, information from the cost-action structure in response to the request, wherein the information from the cost-action structure includes the cost-to-go value for a first one of the locations, the autonomous agent is configured to determine a control decision based on the cost-to-go value for the first one of the locations, and the autonomous agent is configured to move in accordance with the control decision.

9. The non-transitory computer-readable storage device of claim 8, wherein the request for information from the cost-action structure identifies a current location of the autonomous agent, and the information from the cost-action structure is provided based on the current location of the autonomous agent.

10. The non-transitory computer-readable storage device of claim 8, wherein the request for information from the cost-action structure identifies the first one of the locations.

11. The non-transitory computer-readable storage device of claim 10, wherein the request for information from the cost-action structure identifies a second one of the locations, the information from the cost-action structure includes the cost-to-go value for the second one of the locations, and the autonomous agent is configured to determine the control decision further based on the cost-to-go value for the second one of the locations.

12. The non-transitory computer-readable storage device of claim 8, wherein the request for information from the cost-action structure identifies a proposed action, and the first one of the locations is associated with the proposed action.

13. The non-transitory computer-readable storage device of claim 8, wherein the information from the cost-action structure that is provided to the autonomous agent in response to the request further includes the optimal route from the first one of the locations to the destination.

14. The non-transitory computer-readable storage device of claim 8, wherein the cost-to-go value for each of the locations and the optimal route for each of the locations are not dependent on a current location of the autonomous agent.

15. A system, comprising:

one or more memory devices; and one or more processors configured to execute instructions stored in the one or more memory devices to:

determine a routing graph based on a map;

determine a routing horizon based on the routing graph, wherein the routing horizon defines a portion of the routing graph that is usable for routing, and the routing horizon includes locations that are represented by the portion of the routing graph;

determine, for each of the locations, an optimal route from the location to a destination using the routing graph and a graph search algorithm;

determine, for each of the locations, a cost-to-go value for travel from the location to the destination using the optimal route from the location to the destination;

store the optimal route and the cost-to-go value for each of the locations in a cost-action structure;

receive, from an autonomous agent, a request for information from the cost-action structure, wherein the request from the autonomous agent is received subsequent to storing the optimal route and the cost-to-go value for each of the locations in the cost-action structure; and provide, to the autonomous agent, information from the cost-action structure in response to the request, wherein the information from the cost-action structure includes the cost-to-go value for a first one of the locations, the autonomous agent is configured to determine a control decision based on the cost-to-go value for the first one of the locations, and the autonomous agent is configured to move in accordance with the control decision.

16. The system of claim 15, wherein the request for information from the cost-action structure identifies a current location of the autonomous agent, and the information from the cost-action structure is provided based on the current location of the autonomous agent.

17. The system of claim 15, wherein the request for information from the cost-action structure identifies the first one of the locations.

18. The system of claim 17, wherein the request for information from the cost-action structure identifies a second one of the locations, the information from the cost-action structure includes the cost-to-go value for the second one of the locations, and the autonomous agent is configured to determine the control decision further based on the cost-to-go value for the second one of the locations.

19. The system of claim 15, wherein the request for information from the cost-action structure identifies a proposed action, and the first one of the locations is associated with the proposed action.

20. The system of claim 15, wherein the information from the cost-action structure that is provided to the autonomous agent in response to the request further includes the optimal route from the first one of the locations to the destination.

21. The system of claim 15, wherein the cost-to-go value for each of the locations and the optimal route for each of the locations are not dependent on a current location of the autonomous agent.

* * * * *